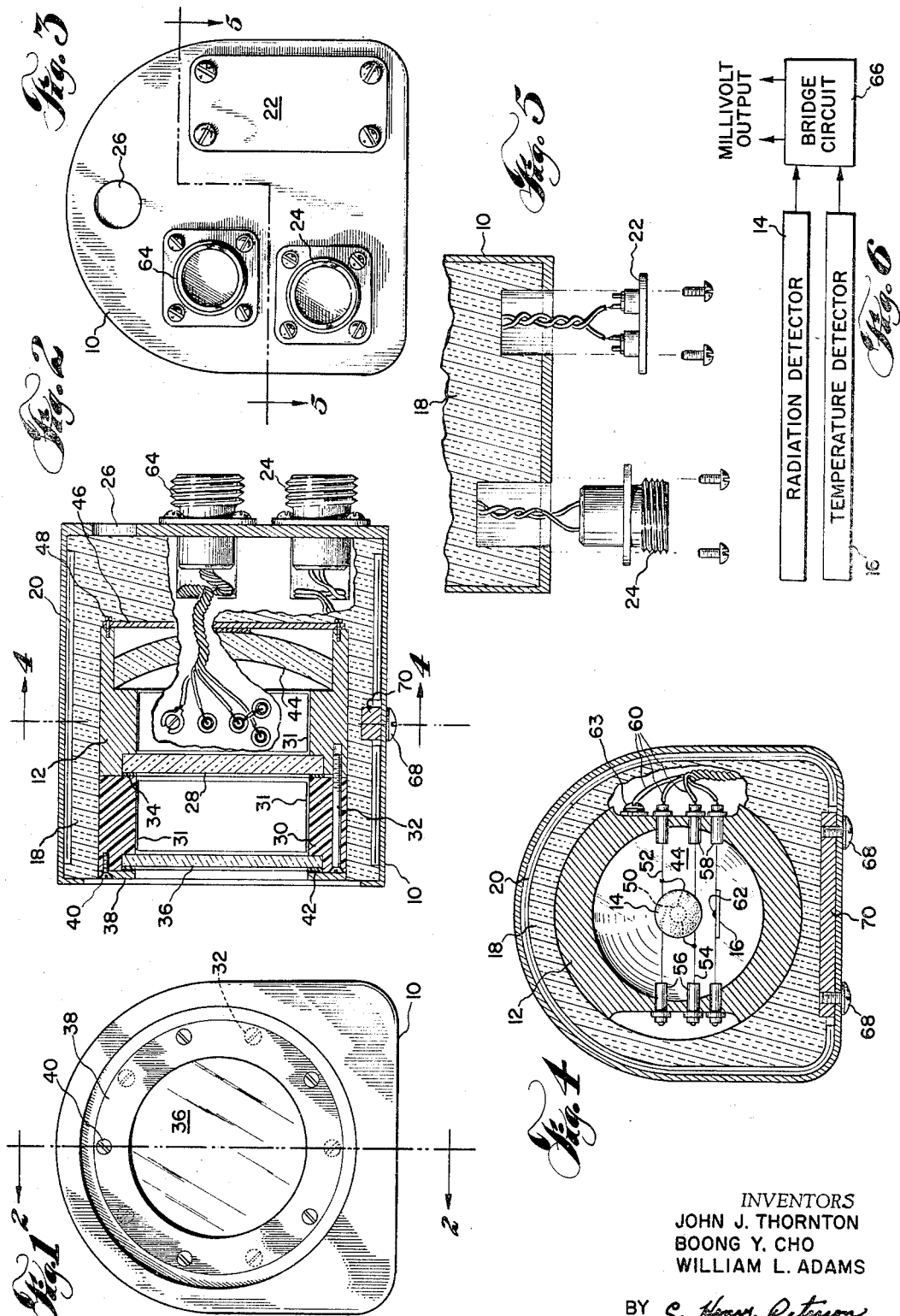

United States Patent Office 3,489,008
Patented Jan. 13, 1970

3,489,008
RADIATION TEMPERATURE SENSOR
John J. Thornton, Columbus, Boong Y. Cho, Hilliard, and William L. Adams, Dublin, Ohio, assignors to Industrial Nucleonics Corporation, a corporation of Ohio
Filed Dec. 1, 1966, Ser. No. 598,453
Int. Cl. G01k 11/00
U.S. Cl. 73—355      16 Claims

ABSTRACT OF THE DISCLOSURE

A thermistor bridge type of infrared radiation sensor (particularly designed to measure the temperature of a paper sheet in a paper making machine environment) which is insensitive to air temperature changes and thermal transients. The sensor has an outer window and an inner window both constructed of the same material (Kodak Irtran 2 material) for transmitting a useful range of infrared wavelengths to the detecting element. The inner window, however, is thicker than the outer window to provide a narrower bandpass characteristic and to insure that infrared radiation characteristically emitted by the outer window which is variable with ambient temperature effects will be absorbed by the inner window. The inner window is thermally coupled to a massive metal housing for the detecting element, and maintained at a substantially constant temperature by an electric heater and thermostat, to insure that the emission from the inner window remains constant.

---

This invention relates to a sensor using infrared radiation for indicating the temperature of a body without contact therewith.

The sensor of the present invention is particularly useful for measuring low-temperature bodies of material employed in a manufacturing operation involving a heat-exchange process, such that the temperature of the material is different, although not greatly different, from the temperature of the ambient air and surrounding objects. The sensor is adapted to provide an electrical output signal having a sensitivity on the order of one millivolt per degree of material temperature change without amplification. It is specifically designed for operation in combination with a dielectric materials gauge for measuring a property of a material, such as its moisture content, which is related to its complex dielectric constant. In such a combination the sensor is adapted to compensate the dielectric gauge for changes in the temperature of the material.

For example, in a system such as that disclosed in the copending application of Robert V. Byrd, Ser. No. 420,889, filed Dec. 24, 1964 for a Measuring System, now abandoned, a radiation temperature sensor is used with a dielectric gauge for measuring the moisture content of paper on a paper making machine. The temperature sensor is attached to the dielectric gauging head and generally located in the vicinity of a steam dryer and/or a steam-heated calender for measuring the temperature of a warm, moist paper sheet. In this environment, the sensor is frequently subjected to drafts and occasional puffs of steam or hot air, as well as to rather severe thermal transients caused by sheet breaks or by the necessary occasional withdrawal of the gauging head and temperature sensor to an off-sheet position where the sensor views the floor, the broke pit or other objects having different temperatures and emissivities from the normally-viewed paper sheet.

It is the general object of this invention to provide an improved sensor for accurately and continuously indicating the temperature of low-temperature bodies under severe environmental conditions. It is a specific object to provide such a sensor which is substantially insensitive to the adverse effects of air temperature changes and thermal transients.

Further objects and advantages will become apparent from the following detailed description of one preferred embodiment of a sensor according to the invention, taken in conjunction with the appended drawings, in which:

FIG. 1 is a front view of a temperature sensor according to the invention, showing the viewing window 36 which is aimed at the object whose temperature is to be measured.

FIG. 2 is a side view of the sensor of FIG. 1, partly cut away, and partly in section on the line 2—2 of FIG. 1.

FIG. 3 is a rear view of the temperature sensor of FIG. 1.

FIG. 4 is a section on the line 4—4 of FIG. 2.

FIG. 5 is a partial section on the line 5—5 of FIG. 3, with the thermostat and one of the connectors shown in detached positions as they would appear in assembly, in the manner of an exploded view.

FIG. 6 is a block diagram of a typical circuit for utilizing the radiation detector and the temperature detector shown in FIG. 4.

With reference to FIGS. 1–5, a preferred sensor according to the invention is assembled in an outer shell 10 of thin sheet metal. Centrally located within the outer shell is a relatively massive metal detector housing 12. The housing 12 contains an infrared radiation detector 14 and a housing temperature detector 16.

The space between the detector housing 12 and the outer shell is filled with insulating plastic foam 18. Around the inner periphery of the outer shell 10 is a so-called tape heater 20. The tape heater comprises a sheet of silicone rubber with a wire heating element embedded therein. The rubber sheet is made with a pressure-sensitive adhesive coating on one side so that it sticks to the inside of the shell 10 for ease of assembly. The heating element is connected through a thermostat 22 and a connector plug 24 to an external heater voltage source (not shown).

In the manufacture of the sensor, the radiation detector housing 12 and attached parts, the tape heater 20, etc., are assembled in place. Then the plastic insulation 18, in the form of a mixed liquid polyurethane foam, is poured in through a vent hole 26 in the rear of the shell 10. The plastic foam is then solidified by baking the assembly in a low-temperature oven for several hours.

The combination of the thermostatically-controlled heater and the insulation is adapted to maintain the detector housing 12 at a reasonably constant temperature above ambient temperature. At the same time, the combination of the insulation and the rather high thermal capacity of the detector housing are adapted to insure that such changes as do occur in the temperature of housing 12 take place quite slowly.

Infrared radiation from the object whose temperature is to be measured enters the detector housing through an inner window 28. Window 28 is seated in a stepped annular recess in the front of housing 12. The housing 12 has a plastic extension 30. Both the extension 30 and the detector housing 12 are lined with reflective gold-flashed adhesive tape 31. The extension 30 is fastened to housing 12 with axially extending screws, whose heads are indicated by dotted circles as at 32 in FIG. 1. The window 28 is clamped between the housing 12 and the extension 30. A synthetic rubber gasket 34 is located between the housing and the extension to press the window into firm contact with the housing 12, so as to assure a good heat transfer relationship between the window and the housing, without danger of putting excessive pressure on the window.

The sensor also has an outer window 36 which is seated in a stepped annular recess in the front of housing extension 30. The outer window is clamped into place by an outer retaining ring 38 which is secured to the housing extension with a plurality of screws as at 40 threaded into the extension. A synthetic rubber gasket 42 is placed between the window and its retaining ring to seal the assembly.

Both of the windows 28 and 36 are constructed of a material of generally low emissivity which is relatively transparent to infrared radiation in a desired range of wavelengths. For the sensor application previously described, we prefer to use windows of polycrystalline zinc sulfide, such as are manufactured and marketed by Eastman Kodak Company under the trade name Irtran 2. This material is relatively transparent to infrared radiation in the range of about two to fourteen microns.

The inner window 28 has a greater thickness than the outer window 36. For the application described, we use an inner window which is 0.125 inch thick and an outer window which is two millimeters (0.080 inch) thick. Since the two millimeter window is a substantially thick window, it provides a path of low thermal conductivity and thereby insulates the space between the windows from the environmental air.

Mounted in an annular stepped recess in the rear of the detector housing 12 is a glass mirror 44. The mirror recess is closed by a cover plate 46 secured to the housing with screws as at 48. The mirror 44 is of a quasi-parabolic design, and is secured at its apex with a dab of suitable adhesive placed between the convex surface of the mirror and the cover plate 46.

The radiation detector 14 is placed in front of mirror 44. The radiation detector comprises a disk of blackened silver foil having a glass-encased thermistor bead 50 bonded to its rear side. The disk is suspended on a pair of wires 52 and 54. The leads of the thermistor bead 50 are soldered to the suspension wires 52 and 54 to provide an electrical connection to the thermistor. The suspension wires are anchored at their left end as shown in FIG. 4 in feed-through insulators as at 56 which pass through drilled openings in the housing 12. At the right end, the suspension wires are anchored in similar feed-through insulators as at 58 and connected via electrical lead wires as at 60 to the external circuit.

The temperature detector 16 comprises a disk of reflective gold foil having a thermistor bead 62 bonded to one side. Thermistors 50 and 62 constitute a matched pair of thermistors whose resistance-temperature characteristics match over a range of temperatures centered around the nominal temperature (for example, 165° F.) at which the detector housing 12 is maintained substantially constant by the use of the thermostatted heater and the insulation.

The temperature detector disk 16 is mounted in a plane which is at right angles to the plane of radiation detector disk 14. The blackened radiation detector disk 14 is mounted in a plane which is substantially normal to the axis of the sensor so that it intercepts and absorbs a maximum amount of the infrared radiation passing through the windows 28 and 36 as well as the radiation reflected by mirror 44. The reflective temperature detector disk 16 is mounted as close as possible to the radiation detector disk 14, and the same suspension mounting is used, so that the convective and conductive thermal coupling of the two detectors to the housing 12 will be identical insofar as possible.

The wires connected to the detectors, as well as a ground wire connected to a ground screw 63 threaded into the housing 12, are twisted as is best shown in FIG. 2 and brought out through a connector plug 64 to an external circuit.

With reference to FIG. 6, the radiation detector 14 and the temperature detector 16 are connected in a conventional bridge circuit 66. Preferably the bridge circuit is balanced when the temperature of the body to be measured by the sensor is at a nominal temperature. At this time the bridge circuit provides no output. When the temperature of the body increases or decreases above or below the nominal temperature, the bridge circuit provides a D.C. millivolt output with a polarity which depends on whether the body temperature is above or below the nominal temperature. The amplitude of the bridge output is a function of the amount of the temperature deviation from the nominal temperature. This millivolt output signal may be connected to a suitably calibrated indicator or recorder for registering the temperature of the body. As is taught in the Byrd application supra, the millivoltage output of the sensor is particularly adapted to compensate a dielectric materials gauge for variations in the temperature of the material which is measured by the dielectric gauge.

The sensor is adapted to be attached to the dielectric materials gauging head or other support member with screws as at 68 which extend through the outer shell 10 of the sensor and are threaded into a suitable mounting bar 70 on the inside of the shell 10. The tape heater 20 is designed with a cutout portion to accommodate the mounting bar.

We have found that a radiation temperature sensor constructed in the manner disclosed overcomes many of the problems associated with the use of such sensors in rather severe environments. For example, we have found that air temperature changes cause transient heating and cooling effects on the outer window. Since a heated body emits radiation according to its composition and its temperature, changes in temperature of the outer window produce changes in emission from the window. This problem is solved according to the invention by making the inner window of a material of such thickness and composition as to substantially absorb the thermal radiation emitted by the outer window. In the preferred sensor described, the inner window is constructed of the same material as the outer window to insure that the radiation characteristically emitted from the outer window will be absorbed by the inner window.

The inner and outer windows constitute band-pass filters of similar radiation absorption characteristics. By constructing the inner window with a greater thickness than the outer window, a narrower band-pass characteristic is imparted to the inner window.

The inner window of course also emits radiation according to its temperature. The absorption of radiation by the inner window tends to change its temperature and therefore to change its radiation emission. However, by maintaining the inner window at a substantially constant temperature by mounting it in efficient heat conducting relationship with the housing 12, which is maintained at substantially constant temperature by the heater, thermostat and insulation arrangement, the emission from the inner window is maintained substantially constant.

Such changes as do occur in the temperature of the inner window are substantially compensated for by the temperature detector 16, since both the inner window and the temperature detector are thermally coupled to the housing 12 to maintain a constant temperature relationship between the window and the temperature detector. The thermal coupling between the temperature detector 16 and the window 28 is effected both by convective air currents over the window and inside the housing as well as by a conductive coupling through the suspension wires to the housing.

The inner window 28 and the housing 12 are thermally insulated from the outer window 36 by the housing extension 30 which is constructed of nylon plastic. The gold foil lining 31 of the tubular housing extension provides a highly reflective surface, to minimize the absorption and emission of thermal radiation by the housing extension, while at the same time it increases the sensitivity of the radiation detector by reflecting wide-angle radiation through the window 28.

While the invention has been shown and described in a specific embodiment, such showing and description is meant to be illustrative only.

What is claimed is:

1. In a sensor for indicating the temperature of a body without contact therewith,
    an infrared radiation detector,
    an outer window having a first bandpass characteristic for passing infrared radiation having a desired range of wavelengths,
    an inner window between said outer window and said detector, said inner window having a second bandpass characteristic similar to said first bandpass characteristic but of narrower range entirely within the range of said first bandpass characteristic, said inner window characteristically absorbing radiation characteristically emitted by said outer window according to its body temperature, and
    means for maintaining said inner window at a substantially constant temperature.

2. In a sensor for indicating the temperature of a body without contact therewith,
    an infrared radiation detector,
    an outer window having a first bandpass characteristic for rendering said window relatively transparent to infrared radiation having a desired range of wavelengths,
    an inner window between said outer window and said detector, said inner window having a second bandpass characteristic similar to said first bandpass characteristic but of a narrower range entirely within the range of said first bandpass characteristic, said inner window characteristically absorbing radiation characteristically emitted by said outer window according to its body temperature, and
    means for maintaining said inner window at a substantially constant temperature above ambient temperature.

3. In a sensor for indicating the temperature of a body without contact therewith,
    an infrared radiation detector,
    an outer window relatively transparent to infrared radiation having a desired range of wavelengths,
    an inner window between said outer window and said detector, said inner window having substantially the same radiation absorption characteristics as said outer window and a greater thickness, and
    means for maintaining said inner window at a substantially constant temperature.

4. A sensor as in claim 3 wherein said inner and outer windows are constructed of the same material.

5. In a sensor for indicating the temperature of a body without contact therewith,
    an infrared radiation detector,
    a temperature detector,
    means responsive to said radiation and temperature detectors for producing a signal which is a function of the temperature of said body,
    an outer window in said sensor, said window being relatively transparent to infrared radiation having a desired range of wavelengths,
    an inner window between said outer window and said detectors, said inner window being constructed of the same material as said outer window and having a greater thickness, and
    means for thermally coupling said inner window to said temperature detector so as to maintain a substantially constant temperature relationship between said inner window and said temperature detector.

6. A sensor as in claim 5 wherein said thermal coupling means comprises a metal housing thermally coupled to said detector and said inner window.

7. A sensor as in claim 5 wherein said thermal coupling means comprises a metal housing thermally coupled to said detector and to said inner window, and means for maintaining said housing at a substantially constant temperature.

8. In a sensor for indicating the temperature of a body without contact therewith,
    an infrared radiation detector,
    a temperature detector,
    an outer window in said sensor, said window having a first bandpass characteristic for rendering said window relatively transparent to infrared radiation having a desired range of wavelengths,
    an inner window between said outer window and said detectors, said inner window having substantially the same radiation absorption characteristics as said outer window and arranged to constitute a filter having second bandpass characteristic of narrower range than said first bandpass characteristic, said second bandpass characteristic being within the range of said first bandpass characteristic,
    a metal housing for said radiation and temperature detectors,
    means for mounting said inner window in one side of said housing, said mounting means being arranged to provide for an efficient heat transfer relationship between said inner window and said housing,
    means for mounting said radiation and temperature detectors in said housing, said detector mounting means being arranged to provide substantially the same convective and conductive thermal coupling between each of said detectors and said housing, and
    means responsive to said radiation and temperature detectors for producing a signal which is a function of the temperature of said body.

9. A sensor as in claim 8 wherein said inner and outer windows are constructed of the same material, and wherein said inner window has a greater thickness than said outer window.

10. A sensor as in claim 8 including means for maintaining the temperature of said housing substantially constant.

11. A sensor as in claim 8 including means for mounting said outer window in spaced relation to said inner window, said window mounting means including means for thermally insulating said outer window from said inner window and said housing.

12. A sensor as in claim 11 wherein said window mounting means comprises a heat-insulative tubular spacer between said inner and outer windows, said spacer having a highly reflective inner surface.

13. A sensor as in claim 8 including means for concentrating radiation entering said housing through said windows onto said radiation detector,
    wherein said radiation detector comprises a first thin disk of radiation absorbing material with a first temperature sensitive electrical element attached thereto, and
    wherein said temperature detector comprises a second disk of radiation reflective material with a second temperature sensitive electrical element attached thereto, said second disk being mounted adjacent to said first disk but being so positioned as to intercept a minimum amount of said radiation entering said housing.

14. A sensor as in claim 8 wherein said radiation detector comprises a first thin disk of radiation-absorbing material mounted in a plane generally normal to the path of radiation entering said housing through said windows, and a first temperature-sensitive electrical element attached to said disk;
    wherein said temperature detector comprises a second thin disk of radiation reflective material mounted in a plane generally parallel to said radiation path, and a second temperature-sensitive electrical element attached to said second disk.

15. A sensor as in claim 14 including a reflector in said housing for concentrating radiation on said first radiation detector disk,
   means for suspending said first radiation detector disk in front of said reflector, and
   means for suspending said second temperature-detector disk adjacent thereto.

16. A sensor for indicating the temperature of a body without contact therewith, comprising
   an infrared radiation detector,
   an outer fixed window having a first bandpass characteristic for passing infrared radiation having a desired range of wave lengths,
   an inner fixed window between said outer window and said detector, said inner window having a second bandpass characteristic similar to said first bandpass characteristic but of narrower range, entirely within the range of said first bandpass characteristic, said inner window characteristically absorbing substantially all of the radiation characteristically emitted by said outer window according to its body temperature,
   a housing enclosing said detector, said housing including an aperture for admitting infrared radiation emitted by said body and passing through said outer window to said detector,
   means for fixedly mounting said inner window in said aperture, and
   means connected to said detector for producing a signal indicative of the temperature of said body.

References Cited

UNITED STATES PATENTS

| | | | |
|---|---|---|---|
| 2,855,492 | 10/1958 | English | 73—355 XR |
| Re. 19,564 | 5/1935 | Quereau | 73—355 XR |
| 1,639,411 | 8/1927 | Mechau | 73—355 |
| 2,811,856 | 11/1957 | Harrison | 73—355 |
| 2,856,540 | 10/1958 | Warshaw | 73—355 XR |
| 2,865,202 | 12/1958 | Bennett | 73—355 |
| 3,098,380 | 7/1963 | Suomi et al. | 73—355 XR |
| 3,194,962 | 7/1965 | Carlon et al. | |
| 3,258,602 | 6/1966 | Promish. | |
| 3,355,589 | 11/1967 | Clifford. | |

LOUIS R. PRINCE, Primary Examiner

FREDERICK SHOON, Assistant Examiner

U.S. Cl. X.R.

250—83.3